United States Patent

[11] 3,602,513

[72] Inventor Richard J. Breen
1215 Alhambra Circle, Coral Gables, Fla. 33134

[21] Appl. No. 788,505
[22] Filed Jan. 2, 1969
[45] Patented Aug. 31, 1971

[54] FOREIGN LANGUAGE VOCABULARY DRILL GAME
5 Claims, 8 Drawing Figs.

[52] U.S. Cl. .......... 273/135 B, 35/35 H, 35/71
[51] Int. Cl. .......... A63f 3/06, G09b 19/06
[50] Field of Search .......... 273/135, 135 B; 35/35, 35 J, 35 H, 71

[56] References Cited
UNITED STATES PATENTS
778,110 12/1904 Cannon .......... 35/35
3,271,884 9/1966 Roberson .......... 35/35

*Primary Examiner*—Anton O. Oechsle
*Attorney*—Meyer A. Baskin

ABSTRACT: A foreign language vocabulary drill game is played with two different sets of cards, one set called the "player cards" has two sides. On the first side are two columns of words with the words of the two languages having the same meaning being on the same line, and a column of points score for each line. On the second side of the player cards is also two columns of words. The first column being identical with the first column of the first side, the second column of words in the unknown language being scrambled, that is to say the words of the same meaning are not opposite each other.

Each player has one player card. There is another set of cards called the "word cards," on each of which there is a single word in one of the languages with the same word in the other language on the reverse side of it. These word cards are in a pile with only one word card exposed at a time. The players pick a letter from the exposed word card and cover this letter from the words on the first line of the first side. The first one to cover one word and call "Lingo" or both words on his first line and call "Lingo-Bingo" is the winner of that part of the play, and receives the point total indicated on that line on his card. Each line is played in succession. After all of the lines on the first side of the player card are finished by someone winning each line, all of the player cards are reversed and the play continues on the second side with the scrambled words.

The principal difference from the play on the first side is that the player must cover the letter chosen from the word card beginning with the first word in the first column and then in order to win the line must also cover at least one letter in the correct translation of the word in the second column.

INVENTOR.
RICHARD J. BREEN
BY Meyer A. Baskin
ATTORNEY.

INVENTOR.
RICHARD J. BREEN
BY Meyer A. Baskin
ATTORNEY.

FOREIGN LANGUAGE VOCABULARY DRILL GAME

This invention relates generally to the art of games and, more particularly, to a game which may be played by two or more persons, or between two or more "sides," composed of groups or "teams" of players or contestants, utilizing two sets of cards. One set of cards are "the player's cards." The other set of cards are "the word cards."

The rules and procedures to be followed in playing this game and method of determining the "winner" or "winning side" shall be set forth hereinafter, but it should be understood that this is a game to be played between contestants for pleasure and entertainment, since the basic factor of this game comprises the use of two sets of playing cards which bear words of any two different languages, the playing of this game has the added advantage, to the game player, of learning a language thoroughly and quickly while being entertained.

This invention provides many improvements in the generally related prior art, which improvements are novel, useful and have many advantages and desirable characteristics not contained nor disclosed in any previously known games.

It is the principal object of this invention to provide an improved card game which may be played between two or more people or contestants, utilizing cards having words of any two languages, printed, or otherwise imposed thereon, and the establishment of a set of rules, whereby the elements of skill and chance are combined to determine the winner.

Another object of this invention is to provide a novel and improved card game which may be played for entertainment, between two or more contestants, or groups of contestants, each group comprising a side or team, utilizing two sets of cards, each set of cards bearing the words of any two languages and the establishment of rules of play, whereby the elements of skill and chance determine the winner.

A still further object of this invention is the provision of a novel and improved card game which may be played for entertainment, between two or more contestants, or groups of contestants, utilizing a set of players cards, and another set of word cards, each of said sets of cards bearing the words of any two languages, one side of each of said players cards is provided with a vertical left-hand column of a number of words in one of the languages, directly opposite each of said words of said vertical left-hand column and in alignment therewith are their translation into the other language arranged in a complementary vertical right-hand column, and in a margin immediately following the words of the language appearing in the left-hand column, there is printed, or otherwise imposed, a number indicating the point value of the individual words of the language appearing in the left-hand column and their individual translation into the language appearing in the right-hand column.

Yet another object of this invention is the provision of a novel and improved card game which may be played for entertainment, between two or more contestants, or groups of contestants, utilizing a set of player cards and another set of word cards, each of said sets of cards bearing the words of any two languages, one side of each of said player cards is provided with a vertical left-hand column of a number of words in one of the languages, directly opposite said left-hand column of words there is a vertical right-hand column of words which comprise translations of the words in the vertical left-hand column into the language of the vertical right-hand column of words, but the words appearing in said right-hand column are "scrambled" and not in alignment with their respective translations appearing in the left-hand column, and there is a margin provided immediately following the words of the language appearing in the left-hand column, in which is printed, or otherwise imposed, a number, indicating the point value of the individual words of the language appearing in the left-hand column when correctly translated into the unaligned word of the language appearing in the right-hand column, or vice versa.

These and many other objects and advantages of the present invention will readily become apparent from the following detailed description of one form thereof illustrated in the accompanying drawings. While it is contemplated that the card game of this invention may combine any two languages, the languages of English and Spanish have been chosen for purposes of illustration and convenience. In the drawings, therefore:

Figure 1:
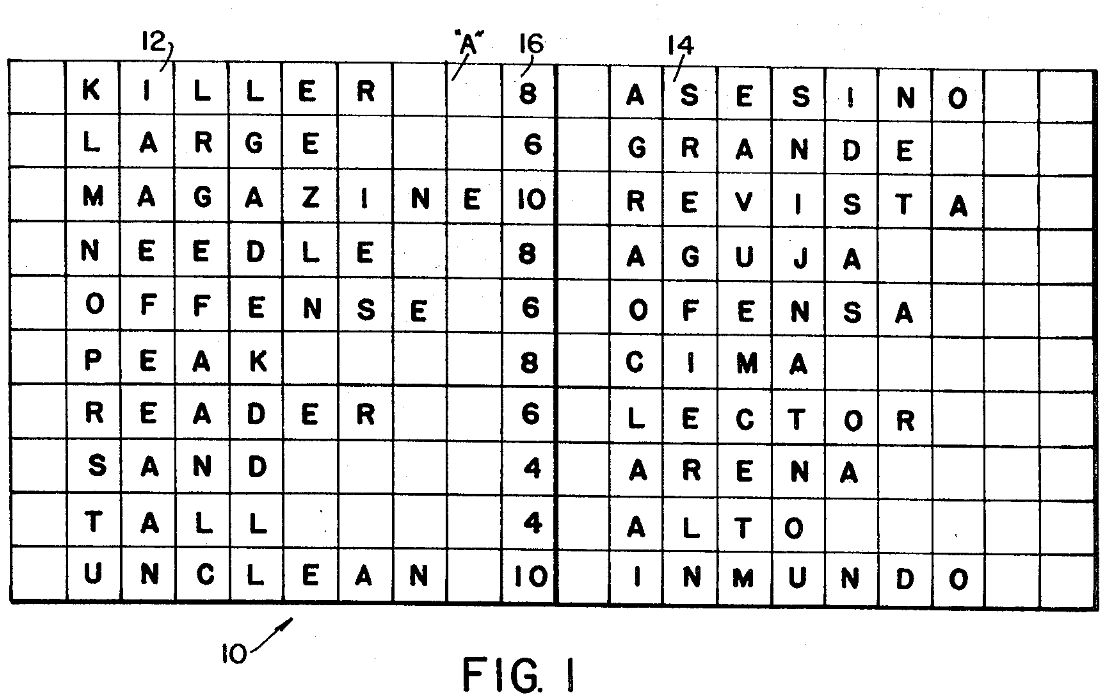
FIG. 1 is a plan view of one side or face of a players card used in the play of the game of this invention.

Referring now to the drawings in detail, in which like characters of reference indicate like parts throughout the several views, there is illustrated in FIG. 1, in plan view, a player card numbered 10 in general. Each player receives one of said players cards on which there are printed, or otherwise imposed, words of the two languages on both sides or faces of each players card. As before stated, English and Spanish are used for illustration.

The game begins on what is known as side one and is lettered "A," see FIG. 1 of the drawing. There are 10 English words arranged in a left-hand column 12, in the form used for illustration, and there are 10 Spanish words arranged in a right-hand column 14, each Spanish word in the right-hand column 14 being the Spanish translation for the English word in left-hand column 12 with which it is directly aligned horizontally. A vertically extending column 16 is provided, immediately following each English word, in which is printed a specific point total number signifying the point value of individual English words and their individual Spanish translation.

For example —"Large" —6 —"Grande."

Figure 2:
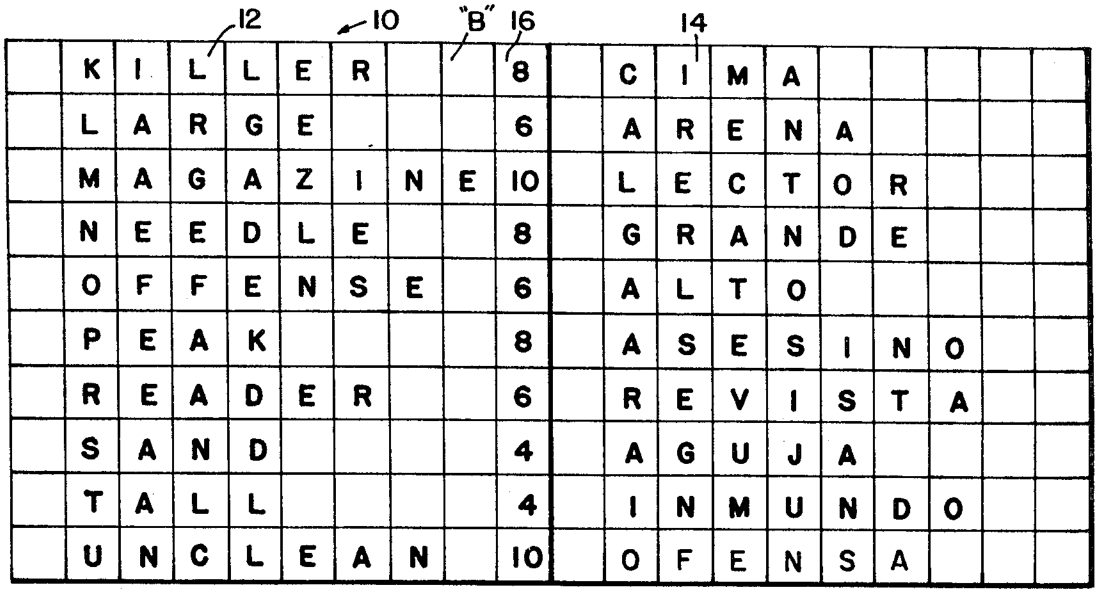
FIG. 2 is a plan view of the opposite side or face of the players card illustrated in FIG. 1.
Figure 3:
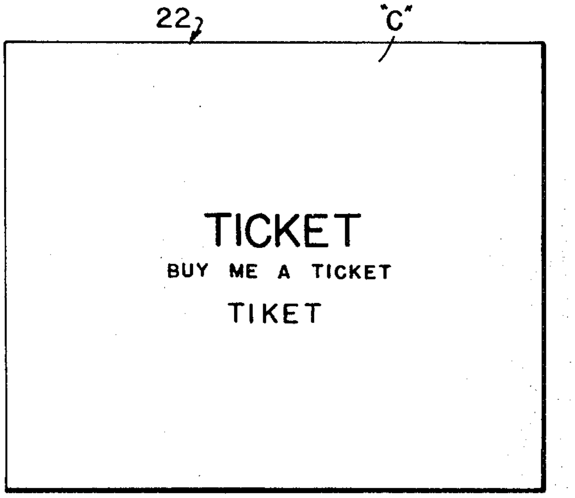
FIG. 3 is a plan view of one side or face of a word card used in the play of the game of this invention.
Figure 4:
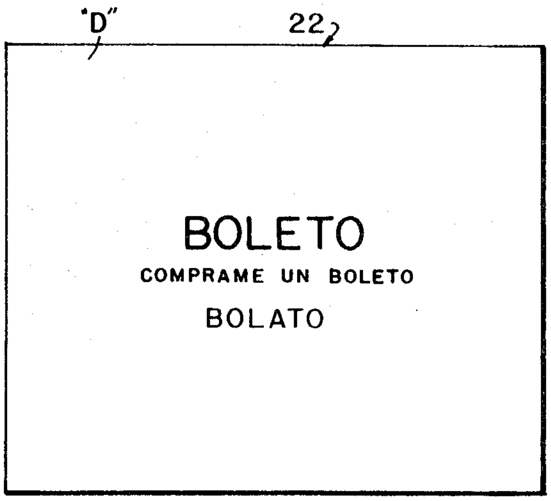
FIG. 4 is a plan view of the opposite side or face of the word card illustrated in FIG. 3.

In FIG. 2 of the drawing, there is illustrated, in plan view, the opposite side or face of the players card 10, illustrated in FIG. 1. This face is known as side two and is lettered "B." This side may have a different color background to distinguish it from side A. Side two or "B" of players card 10 has the same left-hand column 12 consisting of the same 10 English words, arranged in the identical order, and has the same numerical point values arranged in vertically extending column 16, immediately following each English word, as side one lettered "A," as shown in FIG. 1. Side two or "B" has a right-hand column 14 composed of a list of 10 Spanish words which are translations of the 10 English words listed in left-hand column 12, however, there is an important difference in the arrangement of the 10 Spanish translations listed in right-hand column 14 of side two or "B," these Spanish translations are scrambled so that they are not aligned horizontally directly opposite their English translations in left-hand column 12 as they are in side one or "A" of the players card 10 illustrated in FIG. 1.

Figure 6:
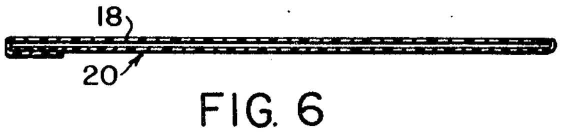
FIG. 6 is a cross-sectional view taken on the line 6—6 of FIG. 5 in the direction indicated by the arrows.

The players cards 10 may be made of cardboard or any other desireable material of the preferred firmness or semiflexibility and both faces "A" and "B" of the cards may be covered with a protective layer 18 of acetate or similar transparent material which permits the players to mark the player card 10 quickly with a grease pen, or the like, as the game progresses and facilitates erasure of the markings after the game is completed and before starting another game. See FIG. 6.

Figure 5:
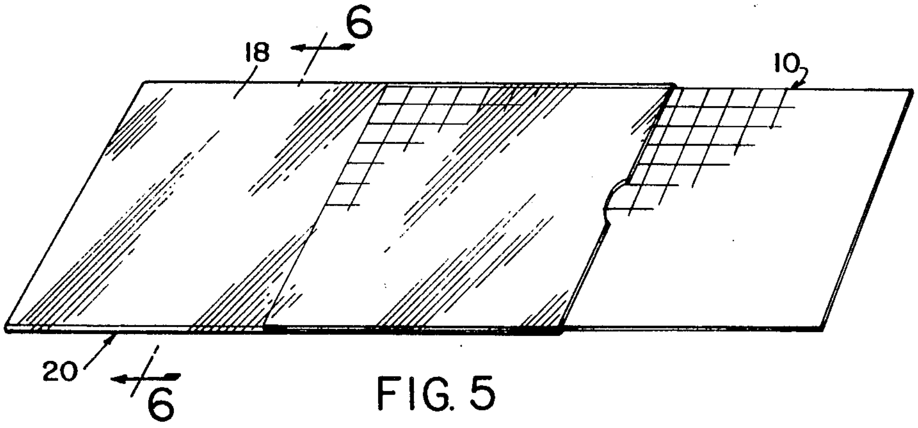
FIG. 5 is a diagrammatic view in perspective of a transparent protective envelope adapted to receive a players card by sliding it into the only open end of said envelope, as illustrated the players card is partially inserted within the envelope.

A novel and useful manner of covering both faces "A" and "B" of players card 10 is the provision of a transparent protective envelope so to serve as the protective layer 18, just described. Such an envelope may be of transparent acetate, or the like, and if said envelope 20 is sealed at one end and along two sides, leaving one end unsealed, or open, it will be adapted to receive a player card 10 by sliding said card 10 into said open end, as clearly illustrated in FIG. 5.

Each player receives a different player card 10 with a different left-hand column 12 of English words and a corresponding right-hand column 14 of Spanish translations of said English words. No two players cards 10 have the same words in either English or Spanish, but every player card has the exact same total point potential.

In the preferred form of this game 100 player cards 10 are provided.

The word cards, numbered 22, in general, comprise a stack of 1000 cards, having one word in English on one side or face, lettered "C," of each word card 22, and the Spanish translation of said English word on the opposite side or face, lettered "D," of that particular word card 22. If desired, the phonetic pronunciation may be applied, under the Spanish or English translation. The words may be applied by printing, or in any other manner, and the cards made of any desired material. The word cards 22 will feature the thousand words that appear on the 100 player cards 10 which make up the game, this being the preferred ratio.

The game is named "LINGO-BINGO" and the words Lingo and Lingo-Bingo are called out by the players at certain times and under certain conditions, as will be hereinafter set forth.

The game commences by having someone flip over the first word card 22, from English to Spanish. All of the "word cards" 22 may be placed in a stack or in a rack 24 if desired, which rack 24 is adapted to hold the word cards in a prominent position before the game players and to permit ease in turning said word cards, and if it has been decided, as stated above, to have all the cards arranged in the stack with the English worded face "C" of each word card 22 faced upwardly in the stack, the act of flipping over the top card in the stack, or rack 24, which is the first word card 22, will expose and reveal the Spanish translation appearing on face "D" of the English word on face "C."

Each of the players may then select one letter and only one letter from this exposed Spanish word and apply it to the first English word in left hand column 12 of side one, lettered "A,"of their players card 10 and its Spanish translation in right-hand column 14 of said side one, lettered "A" of their players card 10. In playing this first phase of the game, that is on side one, lettered "A," each player will black out the letter he has selected, using a grease pencil as previously suggested, on the protective transparent acetate layer 18, or on the envelope 20, of similar material, as previously described, as often as the selected letter appears in the English word in left-hand column 12 and in its Spanish translation appearing in aligned right-hand column 14.

Each player may select and black out his own choice of letter and need not be influenced by any of the other players' selections.

The game progresses in the above described manner as the next word card 22 in the stack or rack 24 is turned over exposing another Spanish translation, appearing on face "D" of said card, being a translation of the English word appearing on face "C" of the opposite face of said word card 22, and each player again selects another letter from this Spanish translation appearing on face "D" and applies it to his player card 10 by marking or blacking out the letter chosen, exactly as described for the play of the first, or any preceding word card 10.

The object of the game on the part of each player is to fill in the first complete English word in left-hand column 12 of side one, lettered "A," and/or the first complete Spanish word in right-hand column 14, which is the translation of the English word in left-hand column 12, of his player card 10 before any of the other players do. The first player to fill in either the first English word appearing in left-hand column 12 or its aligned Spanish word appearing in right-hand column 14 may call out—Lingo. This player will then receive and be accredited with the numerical point total specified for that particular word which appears in vertically extending column 16. At this point the play of the first line will be over, with the other players scoring no points. The play then proceeds to the second line, third line, etc., in sequence until all lines are completed.

If, however, the player who first filled in the first English or Spanish word, as above described, decides that he has a chance, or decides to try, to fill in both the English word in left-hand column 12 and the Spanish word in right-hand column 14, before any of the other players are able to fill in either the English word of left-hand column 12, or the Spanish word appearing in right-hand column 14, said player may choose to remain silent rather than call out Lingo. At this point said player is risking the possible acquisition of the higher point rewards of Lingo-Bingo against the possibility of forfeiting the point total of Lingo which he has acquired, but not declared.

If the aforesaid player succeeds in filling in *both* the English word of left-hand column 12 *and* the Spanish word of right-hand column 14 of his player card 10, before any of the other players fill in their English or Spanish words, he calls out Lingo-Bingo.

If the point value was 4, for example Sand—4—Arena—the winning player of Lingo-Bingo receives four points for the English word, plus four points for the Spanish word, for a total of eight points, which is then doubled for a grand total of 16 points.

If, however, any one of the other players had filled in either the English word or the Spanish word on his player card 10 before the player trying for Lingo-Bingo had achieved it, such other player could have called out Lingo and received the point total therefor designated, thus blocking the player trying for Lingo-Bingo and ending the play of the first line.

In the event of simultaneous Lingos, each player achieving a Lingo will receive their respective points, as above described, all other players receive nothing. The same scoring rules apply to any players who achieve simultaneous Lingo-Bingos. If there is a Lingo and a Lingo-Bingo achieved at the same time, the player having the Lingo-Bingo is awarded the appropriate points, as before described, and the player having the Lingo and the other players receive nothing.

The game progresses in the described fashion until all 10 English—Spanish lines of words appearing on face "A" of the player cards 10, in the particular game, have been completed.

Point totals are recorded at the bottom of the left-hand column. An extra line, not shown, may be provided for such scoring records if desired.

All of the players play the first line on the A side of their player cards and when one player has covered all of the letters on one of the words on the first line and called Lingo or one of the players has covered all of the letters on both words of the first line and called Lingo-Bingo the play on that line is over.

All the players pick a letter from the same word card, each time. If there is no letter on the word card which will match with a letter on the particular line that is being played on that player card then the player does not have any chance to cover a letter and must wait for the next word card.

After all ten English—Spanish lines have been completed, as they appear on face "A" of one of the player cards 10 the cards are turned over to begin the second phase of Lingo-Bingo.

Each player has one player card each of which is different from the other player cards, but all player cards have the same point total. All players are competing at once from the same word card. The word card is turned over showing the translation, then changed to the next word card in the pile as soon as all players have had a reasonable period of time to select a letter, the time being predetermined by the players. This time should normally not exceed 1 minute.

The second side or face of each player card 10, which is lettered 37 B" and illustrated in FIG. 2 of the drawings is played in basically the same manner as side one of said player card 10, lettered "A," before described, with the following important exceptions:

On side one of each player card 10, lettered "A," each Spanish translation was arranged in a right-hand column 14, and was directly opposite and in horizontal alignment with each corresponding English word, arranged in a left-hand column 12, as shown in FIG. 1. There are 10 such horizontally aligned English and Spanish words.

However, on side two, lettered "B," of each "player card" 10, the same English words appear in the left-hand column 12 and are arranged in the same order as one side one of each player card 10, *but* in the right-hand column 14 of Spanish translations, the Spanish words are completely scrambled, with respect to the English words appearing in left-hand column 12.

In the play of side two, lettered "B," of each player card 10, each player must proceed to fill in the English word appearing in left-hand column 12 with its proper Spanish translation, progressing down the left side of the card from lines of words one through 10. In essence, each player must match up those words which he learned on side one, lettered "A," of his player card 10, in the play of side two, lettered "B," by selecting letters from the word cards 22 as they are flipped over, according to the same procedures and rules before described for the play of side one, lettered "A."

Each player receives the same basic point totals for achieving Lingo or Lingo-Bingo as in the play of side one, lettered "A." However, in the play of side two, lettered "B," of his player card 10, if a player achieves Lingo on the English word in left-hand column 12, but has been found to be working on the incorrect Spanish translation in right-hand column 14, of side two, lettered "B," he does not receive the point total for the Lingo he has achieved on said English word in left-hand column 12, but, on the contrary, he is penalized and said point total becomes a minus instead of a plus. The same penalty is applied in the event of an incorrect Lingo-Bingo.

The important difference between the play on side "B" from play on side "A" of the player cards is that one side "B" for Lingo the player must fill in the word from the first column, column 12, plus in addition at least one letter of the correct translation in the second column, column 14. This is to make sure that the player has recognized the correct translation. This is where the effortless learning takes place.

The play of side two, lettered "B," is continued according to the above-described rules until all 10 English—Spanish lines of words appearing on face "B" of the player card 10, in the particular game have been completed.

The player with the highest net point total of side one, lettered "A" and side two, lettered "B" is the winner of Lingo-Bingo.

Figure 7:
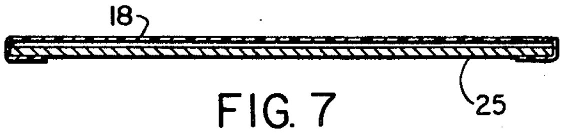
FIG. 7 is a cross-sectional view similar to FIG. 6 except that, as a modified form of this invention, a layer of opaque material has been added to conceal the wording appearing on one side face of the players card.
Figure 8:
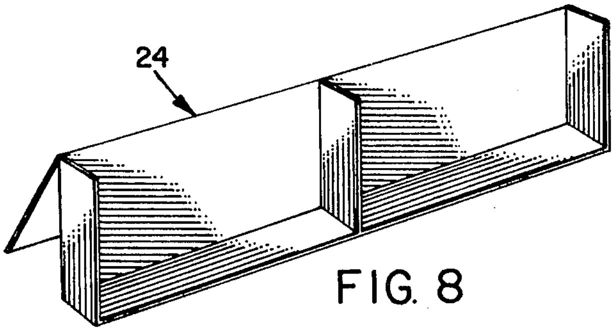
FIG. 8 is a perspective view, shown in reduced size, of a rack adapted to hold the word cards in a prominent position before the game players and to permit ease in turning said word cards.

One modification of the manner of playing this game consists in the provision of a layer of opaque material, 25, as shown in FIG. 7, for the purpose of concealing the wording appearing on one side, preferably side two, lettered "B" of the player card 10.

Another modification of the manner of playing this game contemplates in inclusion of a mystery word on the scrambled side of the player card 10. This is arranged by completely omitting one Spanish translation, in scrambled right-hand column 14 of side "B" of the English word, of which it is a translation, appearing in left hand column 12. The game player is thus required to fill in the appropriate and correct Spanish translation for the English word in left hand column 12, with his grease pencil, or other marking device used, selecting each letter required to make up the undisclosed Spanish translation from the word cards as they are turned over and exposed.

It is contemplated that the word cards may show the word which is featured in phonetic spelling also used in a simple sentence. This may be applied on both the English face "C" and the Spanish face "D" of each word card 22. The word would be large. A desired distance below the word, properly spaced and in smaller type would be the simple sentence. Below the sentence, and in larger type than the sentence, would be the phonetic spelling.

Whereas the present invention has been described in particular relation to the drawings hereto attached it should be understood that other and further modifications, apart from those shown or suggested herein, may be made within the spirit and scope of the claims.

I claim:

1. A foreign language vocabulary drill card game for two or more players utilizing a plurality of words of a known language and translations of each of said words into a foreign language unknown to the players, the game comprising a set of player cards and a set of word cards, each word card having a word of the known language imposed on one face thereof and a word translation in the unknown language imposed on the opposite face thereof; each of the player cards having imposed on one face thereof left and right columns of words, the words of the left column being in the known language and those of the right column being in the unknown language, each word in the left column having its corresponding translation in the right column on the same horizontal line, a number indicating a point value for each of said lines, each of the player cards having imposed on the opposite face thereof left and right columns of words, the left column being a repetition of the left column on said first face, the right column being the same words as in right column on said first face arranged in a scrambled sequence so the words appearing on the same horizontal line are not the correct translations of each other, a number indicating a point value for each of the horizontal lines; one word card being provided for each of the words appearing on the player cards.

2. The foreign language vocabulary drill card game defined in claim 1 in which the sums of said numbers indicating a point value for each of said lines are of identical value on all the player cards of said set.

3. The foreign language vocabulary drill card game defined in claim 1 in which each of said player cards has a transparent protective layer on each of said opposite faces, said layer being markable with an erasable grease marking pencil.

4. A word card game adapted to be played between two or more contestants for entertainment and the learning of any one unknown language, which game includes a set of player cards and a set of word cards, each player card has a plurality of words of a known language imposed thereon and arranged in a vertical left-hand column on one face of said player card and a plurality of words of the unknown language imposed on the same face thereof, arranged in a vertical right-hand column, said words of the unknown language being translations of the words of the known language appearing in the vertical left-hand column, each of said translations, in the right-hand column, are arranged directly opposite to an in horizontal alignment with the corresponding words appearing in the left-hand column, of which it is a translation, a vertical column which includes a number indicating the point value of the individual words of the known language appearing in the left-hand column and their translations into the unknown language appearing in the right hand column, said point column totaling the same number of points on all player cards, each word card has a word of the known language imposed on one face thereof and the translation of said word into the unknown language imposed on the opposite face thereof, and one word card is provided for each of the words appearing in the vertical left-hand column, transparent plastic envelopes, markable with grease pencil, sealed on three side edges and open one one side edge, which are adapted to receive and enclose each player card to permit said player to see the columns of words, of both the known and the unknown languages therethrough and to selectively cover certain letters in the words of both columns by application with a grease pencil.

5. The word card game defined in claim 4 in which said transparent plastic envelope has an opaque side for concealing one side of said "player card" enclosed therein.